US008535587B2

(12) United States Patent
Tokunaga

(10) Patent No.: US 8,535,587 B2
(45) Date of Patent: Sep. 17, 2013

(54) METHOD FOR MANUFACTURING PLUGGED HONEYCOMB STRUCTURE

(75) Inventor: Takeshi Tokunaga, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 8 days.

(21) Appl. No.: 13/217,838

(22) Filed: Aug. 25, 2011

(65) Prior Publication Data

US 2011/0304073 A1 Dec. 15, 2011

Related U.S. Application Data

(63) Continuation of application No. PCT/JP2010/066814, filed on Sep. 28, 2010.

(30) Foreign Application Priority Data

Sep. 29, 2009 (JP) ................................ 2009-223864

(51) Int. Cl.
*B29C 39/10* (2006.01)

(52) U.S. Cl.
USPC .......................................... 264/273; 264/261

(58) Field of Classification Search
USPC .......................................................... 264/273
See application file for complete search history.

(56) References Cited

U.S. PATENT DOCUMENTS

2007/0210485 A1 9/2007 Hatano et al.
2008/0128082 A1* 6/2008 Masuda et al. ................ 156/293

FOREIGN PATENT DOCUMENTS

| | | | |
|---|---|---|---|
| JP | 01-192504 | A1 | 8/1989 |
| JP | 05-123514 | A1 | 5/1993 |
| JP | 2001-300922 | A1 | 10/2001 |
| JP | 2007-237662 | A1 | 9/2007 |
| JP | 2008-055738 | A1 | 3/2008 |

OTHER PUBLICATIONS

PDF of web page of www.engineeringtoolbox.com for Young's modululs of rubber.*

* cited by examiner

*Primary Examiner* — Joseph S Del Sole
*Assistant Examiner* — Kimberly A Stewart
(74) *Attorney, Agent, or Firm* — Burr & Brown

(57) ABSTRACT

A method for manufacturing a plugged honeycomb structure includes: a step of forming a columnar honeycomb formed body, and a plugging step of forming plugging portions in each of cells of the honeycomb formed body; wherein the plugging step has a plugging slurry injection operation where plugging slurry is injected into the cells by inserting the honeycomb formed body into a bottomed cylindrical inside container containing the plugging slurry and having a Young's modulus of 5 to 550 MPa and a tensile stress of 0.5 to 11 MPa and being disposed in a bottomed cylindrical outside container and by pressing one end portion against the bottom face of the inside container, and then the honeycomb formed body is pulled out from the inside container. There is provided a method for manufacturing a plugged honeycomb structure, the method being capable of inhibiting depression and protrusion of plugging portions.

17 Claims, 4 Drawing Sheets

METHOD FOR MANUFACTURING PLUGGED HONEYCOMB STRUCTURE

BACKGROUND OF THE INVENTION

1. Field of the Invention

The present invention relates to a method for manufacturing a plugged honeycomb structure, and more specifically to a method for manufacturing a plugged honeycomb structure, the method being capable of inhibiting depression and protrusion of the plugging portion.

1. Description of Related Art

In various fields such as chemistry, electric power, and iron and steel, there is employed a ceramic plugged honeycomb structure excellent in thermal resistance and corrosion resistance as a carrier for a catalyst device or as a filter for an environmental measure, collection of a specific substance, or the like. In particular, recently, a plugged honeycomb structure has been highly demanded as a diesel particulate filter (DPF) for trapping particulate matter (PM) discharged from a diesel engine.

As shown in FIG. 8, the plugged honeycomb structure 31 is a structure where plugging portions 36 are formed in an end portion of each of the cells 34 of the honeycomb structural portion 33 provided with porous partition walls 32 separating and forming the cells 34 functioning as fluid passages. FIG. 8 is a cross-sectional view cut along a plane including the central axis, schematically showing a structure of a plugged honeycomb structure. The plugging portions 36 are disposed in one open end of each of the predetermined cells 34 and in the other open end of each of the remaining cells 34. In the plugged honeycomb structure 31, plugging portions 36 are alternately formed in open ends of cells 34 in the fluid inlet face B and open ends of cells 34 in the fluid outlet face C (see, e.g., Patent Document 1).

For example, when the plugged honeycomb structure 31 is used as a DPF to introduce a target gas G1 to be treated into cells 34 from the inlet face B, the gas G1 passes through the porous partition walls 32, flows into the adjacent cells 34, and is discharged from the outlet face C as treated gas G2. When the target gas G1 passes through the partition walls 32, dust and particulate matter contained in the target gas G1 are trapped by the partition walls 32.

The plugged honeycomb structure 31 described above can be manufactured by the plugging step after obtaining a columnar honeycomb formed body having porous partition walls separating and forming a plurality of cells functioning as fluid passages. In the plugging step, in the first place, a mask is bonded to one end face of the honeycomb formed body. The mask is bonded by applying an adhesive film on one end face of the honeycomb formed body and making holes in the adhesive film at portions corresponding to the cells to be plugged by laser processing with image processing. Then, the one end face having the mask of the honeycomb formed body is immersed in slurried plugging material (plugging slurry) containing ceramic and stored in a container to fill the plugging material into the cells where plugging portions are to be formed. Also, in the other end face of the honeycomb formed body, the plugging material is filled into the cells where plugging portions are to be formed in the same manner.

PRIOR ART DOCUMENT

Patent Document 1: JP-A-2001-300922

SUMMARY OF THE INVENTION

However, in the case of manufacturing the plugged honeycomb structure through the aforementioned plugging step, there arises a problem of having a depression (sink) formed in a plugging portion or a protrusion (dropping plug) from an end face of the honeycomb formed body.

The present invention has been made in view of the aforementioned problem and aims to provide a method for manufacturing a plugged honeycomb structure, the method being capable of inhibiting the depression and protrusion of a plugging portion.

In order to solve the aforementioned problem, the present invention provides the following method for manufacturing a plugged honeycomb structure.

[1] A method for manufacturing a plugged honeycomb structure comprising: a step of forming a columnar honeycomb formed body having partition walls separating and forming a plurality of cells extending from one end face to the other end face and functioning as fluid passages, and a plugging step of forming plugging portions in an end portion of each of the cells of the honeycomb formed body; wherein the plugging step has a plugging slurry injection operation where plugging slurry is injected into the cells by inserting the honeycomb formed body into a bottomed cylindrical inside container containing the plugging slurry and having a Young's modulus of 5 to 550 MPa and a tensile stress of 0.5 to 11 MPa and being disposed in a bottomed cylindrical outside container and by pressing one end portion against the bottom face of the inside container, and then the honeycomb formed body is pulled out from the inside container.

[2] A method for manufacturing a plugged honeycomb structure according to [1], wherein the depth of the inside container is 40 to 150% of the depth of the outside container and wherein the diameter of the outer periphery of the inside container is 90 to 98% of the diameter of the inner periphery of the outside container.

[3] A method for manufacturing a plugged honeycomb structure according to [1] or [2], wherein the material for the inside container is at least one kind selected from the group consisting of polyurethane rubber, silicone rubber, neoprene rubber, fluoro-rubber, and natural rubber.

[4] A method for manufacturing a plugged honeycomb structure according to any one of [1] to [3], wherein the thickness of the inside container is 0.5 to 2.5 mm.

[5] A method for manufacturing a plugged honeycomb structure according to any one of [1] to [4], wherein the diameter of the inner periphery of the inside container is 102 to 118% of the diameter of a cross section perpendicular to a central axis of the honeycomb formed body.

[6] A method for manufacturing a plugged honeycomb structure according to any one of [1] to [5], wherein the material for a honeycomb structure to be manufactured is ceramic.

[7] A method for manufacturing a plugged honeycomb structure according to any one of [1] to [6], wherein the bending strength of the outside container according to an ASTM test is 100 MPa or more.

[8] A method for manufacturing a plugged honeycomb structure according to any one of [1] to [7], wherein the material for the outside container is metal.

According to a method for manufacturing a plugged honeycomb structure of the present invention, since the plugging step has a plugging slurry injection operation where "plugging slurry is injected into the cells by inserting the honeycomb formed body into a bottomed cylindrical inside container containing the plugging slurry and having a Young's modulus of 5 to 550 MPa and a tensile stress of 0.5 to 11 MPa and being disposed in a bottomed cylindrical outside container and by pressing one end portion against the bottom face of the inside container, and then the honeycomb formed body is pulled out from the inside container", there can be inhibited the formation of a depression (sink) in a plugging portion or a protrusion of a plugging portion (dropped plug) from an end face of the honeycomb formed body by minimizing a vacuum state between the honeycomb formed body and the bottom face of the inside container through the change in shape of the inside container upon pulling out the honeycomb formed body from the inside container.

DETAILED DESCRIPTION OF THE INVENTION

Figure 1:
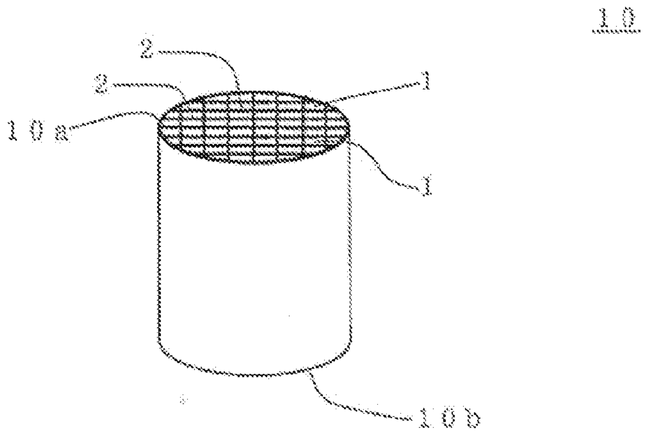
FIG. 1 is a perspective view schematically showing a columnar honeycomb formed body formed in a honeycomb structure manufacturing process in an embodiment of a method for manufacturing a plugged honeycomb structure of the present invention.

An embodiment for carrying out the present invention will be described in detail with referring to drawings. However, the present invention is by no means limited to the following embodiment, and it should be understood that changes, improvements, and the like of the design may appropriately be made on the basis of ordinary knowledge of a person of ordinary skill in the range of not deviating from the gist of the present invention.

An embodiment of a method for manufacturing a honeycomb structure of the present invention has a step of forming a columnar honeycomb formed body 10 (see FIGS. 1, 2) having partition walls 2 separating and forming a plurality of cells 1 extending from one end face to the other end face and functioning as fluid passages and a plugging step of forming plugging portions in an end portion of each of the cells of the honeycomb formed body, and the plugging step has a plugging slurry injection operation where "plugging slurry 6 is injected into the cells 1 (see FIG. 6) by inserting the honeycomb formed body 10 into a bottomed cylindrical inside container 5 containing the plugging slurry 6 and having a Young's modulus of 5 to 550 MPa and a tensile stress of 0.5 to 11 MPa and being disposed in a bottomed cylindrical outside container 4 and by pressing one end portion 11 against the bottom face of the inside container 5, and then the honeycomb formed body 10 is pulled out from the inside container 5 (see FIG. 7)".

Figure 2:
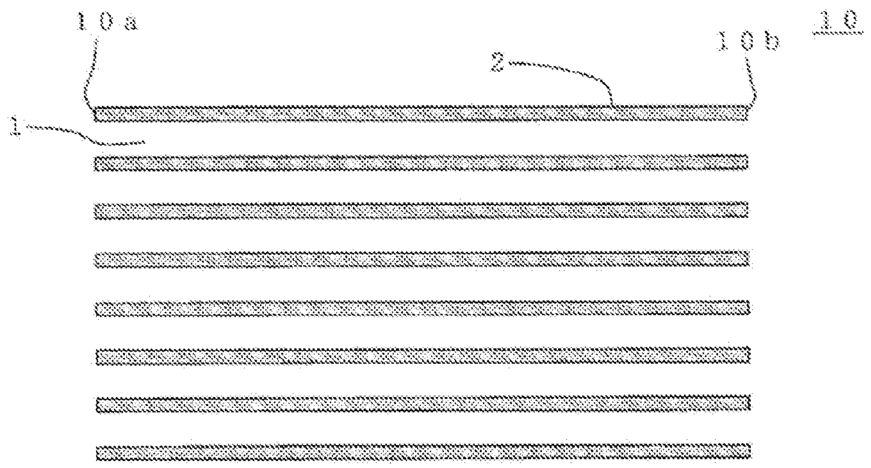
FIG. 2 is a schematic view showing a cross section parallel to the central axis of a columnar honeycomb formed body formed in a honeycomb structure manufacturing process in an embodiment of a method for manufacturing a plugged honeycomb structure of the present invention.
Figure 6:
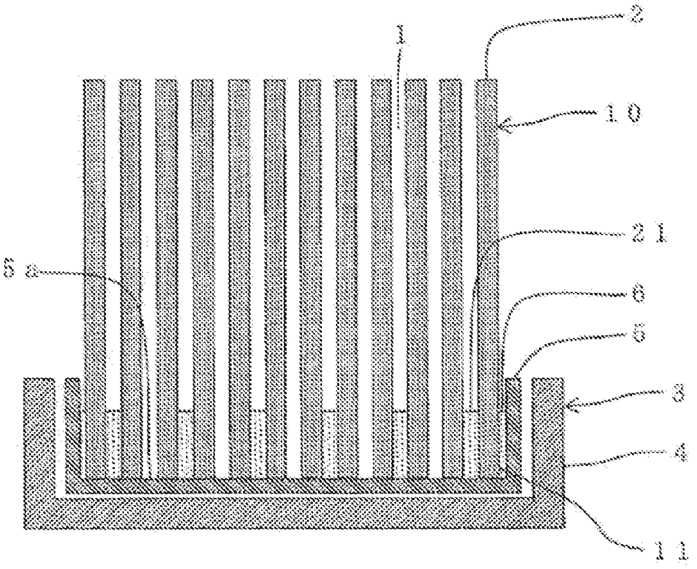
FIG. 6 is a schematic view showing a cross section parallel to the central axis of the inside container, showing a state where a honeycomb formed body is inserted in the inside container under pressure in an embodiment of a method for manufacturing a plugged honeycomb structure of the present invention.
Figure 7:
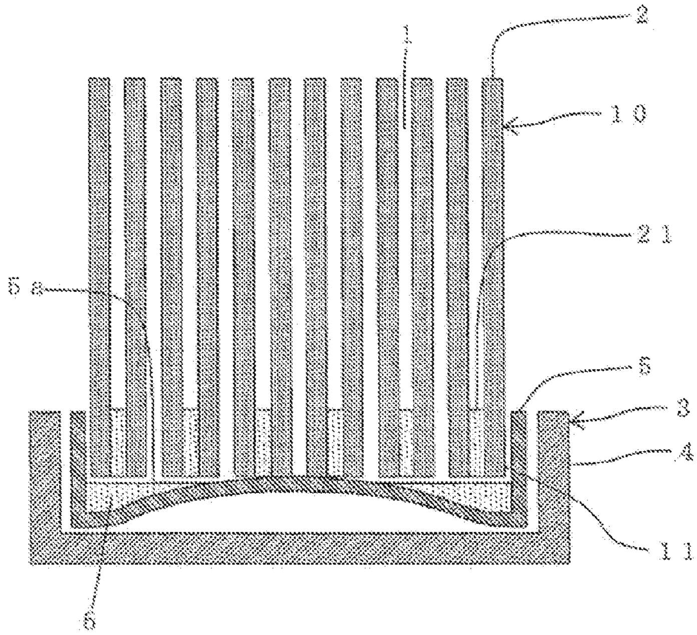
FIG. 7 is a schematic view showing a cross section parallel to the central axis of the inside container, showing a state where a honeycomb formed body is pulled out from the inside container in an embodiment of a method for manufacturing a plugged honeycomb structure of the present invention.

Here, FIG. 1 is a perspective view schematically showing a columnar honeycomb formed body 10 formed in a honeycomb structure manufacturing process in an embodiment of a method for manufacturing a plugged honeycomb structure of the present invention. FIG. 2 is a schematic view showing a cross section parallel to the central axis of a columnar honeycomb formed body 10 formed in a honeycomb structure manufacturing process in an embodiment of a method for manufacturing a plugged honeycomb structure of the present invention. FIG. 6 is a schematic view showing a cross section parallel to the central axis of the inside container 5, showing a state where a honeycomb formed body 10 is inserted in the inside container 5 under pressure in an embodiment of a method for manufacturing a plugged honeycomb structure of the present invention. FIG. 7 is a schematic view showing a cross section parallel to the central axis of the inside container 5, showing a state where a honeycomb formed body 10 is pulled out from the inside container 5 in an embodiment of a method for manufacturing a plugged honeycomb structure of the present invention.

Thus, since the plugging step has a plugging slurry injection operation where "plugging slurry is injected into the cells by inserting the honeycomb formed body into a bottomed cylindrical inside container containing the plugging slurry and having a Young's modulus of 5 to 550 MPa and a tensile stress of 0.5 to 11 MPa and being disposed in a bottomed cylindrical outside container and by pressing one end portion against the bottom face of the inside container, and then the honeycomb formed body is pulled out from the inside container", there can be inhibited the formation of a depression (sink) in a plugging portion or a protrusion of a plugging portion (dropped plug) from an end face of the honeycomb formed body through the change in shape of the inside container upon pulling out the honeycomb formed body from the inside container by minimizing a vacuum state between the honeycomb formed body and the bottom face of the inside container.

Conventionally, plugging has been performed by storing plugging slurry in a container made of metal or the like, inserting an end portion of a honeycomb formed body in the container, and then pulling out the honeycomb formed body from the container. In this case, when the honeycomb formed body is pulled out from the container, a vacuum state is caused in the gap between the end face of the honeycomb formed body and the bottom face of the container, and there arises a problem that the plugging slurry (pre-drying plugging portion) filled into cells of the honeycomb formed body is pulled out from the honeycomb formed body (pre-drying plugging portion protrudes) as the honeycomb formed body is pulled out from the container. In addition, there arises a problem of having a deformation (depression) where an end face of the pre-drying plugging portion dents. In contrast, since the method for manufacturing a plugged honeycomb structure of the present embodiment employs a container where the inside container having predetermined properties is disposed in the outside container as the plugging container for storing plugging slurry, the shape of the inside container is changed when the honeycomb formed body (end portion of the honeycomb formed body) inserted into the inside container containing the plugging slurry is pulled out from the inside container. Therefore, since a vacuum state is not caused in the gap between the end face of the honeycomb formed body and the bottom face of the container, the pre-drying plugging portion does not get out from the honeycomb formed body even when the honeycomb formed body is pulled out from the container, and deformation where the end face of the pre-drying plugging portion dents is not caused. Hereinbelow, the method for manufacturing a plugged honeycomb structure of the present embodiment will be described for each step.

(1) Formation of Honeycomb Formed Body (Honeycomb Formed Body Forming Step):

In the step for forming a honeycomb formed body, in the first place, it is preferable to add a binder, a surfactant, a pore former, water, and the like to a ceramic raw material to obtain a forming raw material. The ceramic raw material is preferably at least one kind selected from the group consisting of silicon carbide, silicon-silicon carbide based composite material, cordierite-forming raw material, cordierite, mullite, alumina, titania, spinel, silicon carbide-cordierite based composite material, lithium aluminum silicate, aluminum titanate, and iron-chrome-aluminum based alloy. Of these, cordierite-forming raw material or cordierite is preferable, and cordierite-forming raw material is particularly preferable. Incidentally, cordierite-forming raw material is a ceramic raw material having a chemical composition of 42 to 56 mass % of silica, 30 to 45 mass % or alumina, and 12 to 16 mass % of magnesia and forming cordierite by firing. In the case of silicon-silicon carbide based composite material, a material where a silicon carbide powder and a metal silicon powder are mixed is used as the ceramic raw material. The content of the ceramic raw material is preferably 40 to 90 mass % with respect to the entire forming raw material.

Examples of the binder include methyl cellulose, hydroxypropoxyl cellulose, hydroxyethyl cellulose, carboxymethyl cellulose, and polyvinyl alcohol. Of these, it is preferable to use methyl cellulose and hydroxypropoxyl cellulose together. The content of the binder is preferably 3 to 15 mass % with respect to the entire forming raw material.

The content of water is preferably 7 to 45 mass % with respect to the entire forming raw material.

As the surfactant, ethylene glycol, dextrin, fatty acid soap, polyalcohol, or the like is used. These may be employed alone or in combination of two or more kinds. The content of the surfactant is preferably 5 mass % or less with respect to the entire forming raw material.

There is no particular limitation on the pore former as long as it forms pores after firing, and examples of the pore former include starch, foaming resin, water-absorbing resin, silica gel, and carbon. The content of the pore former is preferably 15 mass % or less with respect to the entire forming raw material.

Next, the forming raw material is formed to obtain a columnar honeycomb formed body 10 as shown in FIGS. 1, 2. Upon forming a forming raw material, in the first place, a forming raw material is kneaded to prepare kneaded material. There is no particular limitation on the method for preparing kneaded material by kneading the forming raw material, and, for example, a method using a kneader, a vacuum kneader, or the like may be employed. The kneaded material is subjected to extrusion to form a columnar honeycomb formed body 10. The honeycomb formed body 10 has partition walls 2 separating and forming a plurality of cells 1 extending from one end face 10*a* to the other end face 10*b* and functioning as fluid passages. The shape of the cross section perpendicular to the central axis (perpendicular to the cell extending direction) of the honeycomb formed body 10 can appropriately be determined according to the use. The shape may be a circle (see FIG. 1), an ellipse, a race track shape, a polygon such as a quadrangle, a pentagon, or a hexagon, or other shapes. There is no particular limitation on a method for forming kneaded material to obtain a honeycomb formed body, and a conventionally known forming method such as extrusion can be employed. A suitable example is a method where a honeycomb formed body is obtained by performing extrusion using a die having a desired cell shape, partition wall thickness, and cell density. The material for the die is preferably superhard alloy which hardly has abrasion.

Next, the honeycomb formed body obtained above is preferably dried. There is no particular limitation on the drying method, and examples of the method include electromagnetic wave heating methods such as microwave heat drying and high frequency dielectric heat drying and external heating methods such as hot air drying and superheated steam drying. Of these, it is preferable to dry a certain amount of water by an electromagnetic wave heating method and then dry the remaining water by an external heating method in that the method can dry the entire honeycomb formed body rapidly and uniformly without generating a crack. As drying conditions, it is preferable that, after removing 30 to 95 mass % of water with respect to the water content before drying by an electromagnetic wave heating method, a water content of 3 mass % or less is obtained by an external heating method. As the electromagnetic heating method, dielectric heat drying is preferable, and, as the external heating method, hot air drying is preferable. The drying temperature is preferably 90 to 180° C., and the drying time is preferably 1 to 10 hours.

Next, in the case that the length in the central axial direction (length in the cell extending direction) of a honeycomb formed body is not desired one, it is preferable to cut off both the end faces (both the end portions) to have a desired length. Though there is no particular limitation on the cutting method, a method using a double-ended rim saw cutter or the like may be employed.

(2) Formation of plugging portion (plugging step):

It is preferable to form plugging portions in open ends of predetermined cells in one end face and open ends of the other cells in the other face of the honeycomb formed body. In the honeycomb formed bodies having plugging portions formed therein, it is preferable that the predetermined cells where plugging portions are formed on the one end face and the remaining cells where plugging portions are formed on the other end face are alternately arranged, so that each of the end faces shows a checkerwise pattern.

As a preferable method for plugging the honeycomb formed body, in the first place, a sheet is bonded to one end face of the honeycomb formed body, and then holes are made in the sheet at positions corresponding to the cells where plugging portions are to be formed. More specifically, there may suitably be employed a method where, after bonding an adhesive film on the entire end face of one end of the honeycomb formed body, holes are made in the adhesive film by a laser only at positions corresponding to the cells (predetermined cells) where plugging portions are to be formed. As the adhesive film, a film obtained by applying an adhesive on a surface of a film of resin such as polyester, polyethylene, thermosetting resin, or the like can suitably be used.

Next, a plugging slurry injection operation is performed. As shown in FIGS. 6 and 7, the plugging slurry injection operation is an operation where "plugging slurry 6 is injected into the cells 1 by inserting the honeycomb formed body 10 into a bottomed cylindrical inside container 5 containing the plugging slurry 6 and having a Young's modulus of 5 to 550 MPa and a tensile stress of 0.5 to 11 MPa and being disposed in a bottomed cylindrical outside container 4 and by pressing one end portion 11 against the bottom face 5*a* of the inside container 5, and then the honeycomb formed body 10 is pulled out from the inside container 5". Here, as described above, when "the honeycomb formed body 10 is inserted into a bottomed cylindrical inside container 5", the inside container 5 may be fixed while moving the honeycomb formed body 10 toward the inside container 5, or the honeycomb formed body 10 may be fixed while moving the inside container 5 toward the honeycomb formed body 10. In addition, when "the honeycomb formed body 10 is pulled out from the inside container 5", the inside container 5 may be fixed while moving the honeycomb formed body 10 away from the inside container 5, or the honeycomb formed body 10 maybe fixed while moving the inside container 5 away from the honeycomb formed body 10. In other words, the plugging slurry injection operation is an operation where "the inside container 5 or the honeycomb formed body 10 is moved in such a manner that plugging slurry 6 is injected into the cells 1 by inserting the honeycomb formed body 10 into a bottomed cylindrical inside container 5 containing the plugging slurry 6 and having a Young's modulus of 5 to 550 MPa and a tensile stress of 0.5 to 11 MPa and being disposed in a bottomed cylindrical outside container 4 and by pressing one end portion 11 against the bottom face 5*a* of the inside container 5, and then the honeycomb formed body 10 is pulled out from the inside container 5". In addition, when the inside container 5 is moved, the slurry stored therein may move to one side due to inclination or vibrations of the inside container 5. Therefore, it is preferable to move the honeycomb formed body 10. Incidentally, in FIGS. 6 and 7, the sheet (adhesive film) bonded on an end face of the honeycomb formed body is not shown.

In the method for manufacturing a plugged honeycomb structure of the present embodiment, the inside container 5 where the plugging slurry 6 is stored has a Young's modulus of 5 to 550 MPa and a tensile stress of 0.5 to 11 MPa. Since the inside container 5 has such properties, when the honeycomb formed body 10 (end portion of the honeycomb formed body) is pulled out from the inside container 5, the shape of the inside container 5 is changed in such a manner that the central portion of the bottom face 5*a* of the inside container is raised as shown in FIG. 7. At this time, the outer rim portion of the end face of the honeycomb formed body 10 is separated from the bottom face 5*a* of the inside container to inhibit the formation of a vacuum state between the end face of the honeycomb formed body 10 and the bottom face 5*a* of the inside container 5. This inhibits the pre-drying plugging portions 21 from getting out of the honeycomb formed body 10 even when the honeycomb formed body is pulled out from the inside container, and depressed deformation of the end face of the pre-drying plugging portions 21 is not caused. Here, the pre-drying plugging portion means plugging slurry filled into cells of the honeycomb formed body during the stage before drying.

The inside container 5 has a Young's modulus of 5 to 550 MPa, preferably 10 to 500 MPa. When the Young's modulus is smaller than 5 MPa, the inside container is too soft. Therefore, when the honeycomb formed body 10 (end portion of the honeycomb formed body) is pulled out from the inside container 5, the state where the honeycomb formed body 10 sticks to the bottom face 5*a* of the inside container is hardly resolved. This causes a depression (sink) in a plugging portion (pre-drying plugging portion) or protrusion (dropping plug) from the end face of the honeycomb formed body, which is not preferable. When the Young's modulus is larger than 550 MPa, the shape of the inside container hardly changes. This causes a depression (sink) in the plugging portion (pre-drying plugging portion) or protrusion (dropping plug) from the end face of the honeycomb formed body, which is not preferable. The Young's modulus is measured according to JIS K 6253.

The inside container 5 has a tensile stress of 0.5 to 11 MPa, preferably 1 to 7.5 MPa. When the tensile stress is smaller than 0.5 MPa, the inside container is fractured in a moment. Therefore, the inside container 5 cannot be separated in a concentric fashion from the honeycomb formed body upon pulling out the honeycomb formed body, and this causes a depression (sink) in a plugging portion (pre-drying plugging portion) or protrusion (dropping plug) from the end face of the honeycomb formed body, which is not preferable. When the tensile stress is larger than 11 MPa, the honeycomb formed body sticks firmly to the inside container 5 when the honeycomb formed body is taken out. If the honeycomb formed body is pulled out as it is, the honeycomb formed body separates from the inside container 5 at a stretch to damage the end face of the honeycomb formed body or cause vacuum fracture. This causes a depression (sink) in a plugging portion (pre-drying plugging portion), or the plugging portion (pre-drying plugging portion) protrudes (dropping plug) from the end face of the honeycomb formed body, which is not preferable. The tensile stress is measured according to a test method with a dumbbell-shaped test piece. The tensile stress is measured according to JIS K 6251 "Vulcanized rubber and thermoplastic rubber—Determination of tensile properties". In addition, the shape of the test piece is JIS K 6251, No. 3, and the tension rate of the test piece is 200 mm/min.

Figure 3:
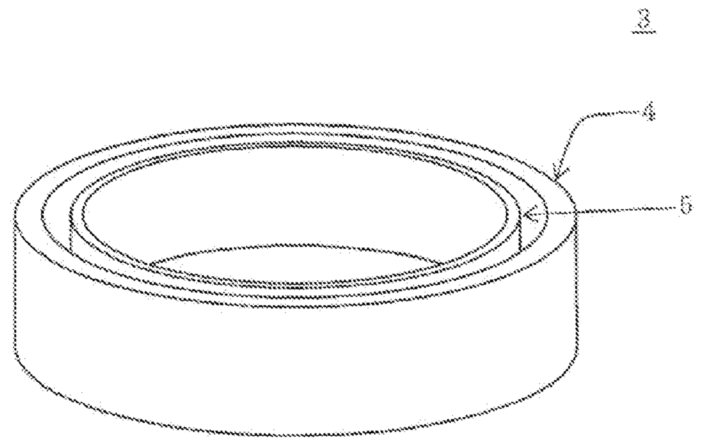
FIG. 3 is a perspective view schematically showing the plugging container used in an embodiment of a method for manufacturing a plugged honeycomb structure of the present invention.
Figure 4:
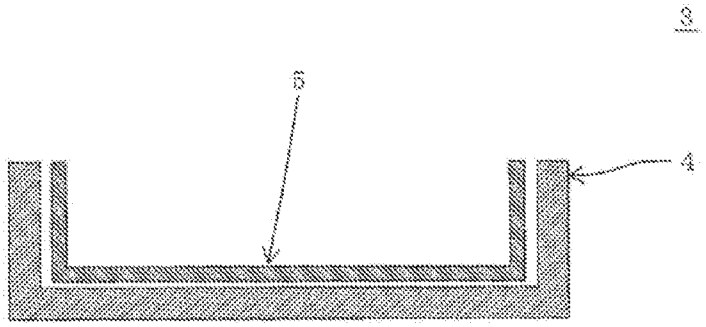
FIG. 4 is a schematic view showing a cross section parallel to the central axis of the plugging container used in an embodiment of a method for manufacturing a plugged honeycomb structure of the present invention.
Figure 5:
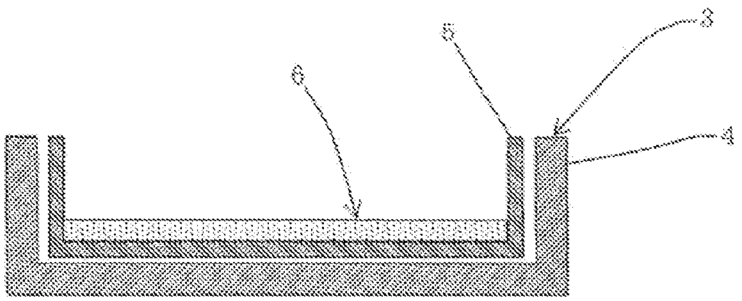
FIG. 5 is a schematic view showing a cross section parallel to the central axis of the inside container, showing a state where plugging slurry is stored in the inside container of the plugging container in an embodiment of a method for manufacturing a plugged honeycomb structure of the present invention.

The inside container 5 is a bottomed cylindrical container constituting the plugging container 3 as shown in FIGS. 3 and 4. Here, the plugging container 3 is provided with a bottomed cylindrical outside container 4 and the bottomed cylindrical inside container 5 disposed in the outside container 4. The thickness of the inside container 5 is preferably 0.5 to 2.5 mm, more preferably 0.7 to 2.0 mm. When the thickness of the inside container 5 is smaller than 0.5 mm, the inside container 5 easily sticks firmly to the honeycomb formed body, and productivity may fall due to deterioration of quality such as plugging depth and end face scoop, fracture of rubber, or the like. When the thickness of the inside container 5 is larger than 2.5 mm, the inside container sticks firmly to the outside container upon injection, resulting in a sink or plugging depth abnormality upon pulling out the honeycomb formed body. The material of the inside container 5 is preferably at least one kind selected from the group consisting of polyurethane rubber, silicone rubber, neoprene rubber, fluoro-rubber, and natural rubber. Of these, urethane rubber is preferable in that it has excellent mechanical strength and abrasion resistance. FIG. 3 is a perspective view schematically showing the plugging container 3 used in an embodiment of a method for manufacturing a plugged honeycomb structure of the present invention. FIG. 4 is a schematic view showing a cross section parallel to the central axis of the plugging container 3 used in an embodiment of a method for manufacturing a plugged honeycomb structure of the present invention.

It is preferable that the inside container 5 is provided with a handle to improve handleability. It is more preferable that the handle is arranged in an open end portion of the inside container 5, and it is more preferable that the handle is arranged over the entire periphery of the open end portion. The shape of the handle is preferably plate-like, and the handle is preferably disposed so as to protrude from the open end portion of the inside container 5 toward outside (outside in a radial direction in a cross section perpendicular to the central axis of the inside container 5). The diameter of the inner periphery of the inside container 5 is preferably 102 to 118%, more preferably 103 to 115%, of the diameter of a cross section of the honeycomb formed body 10 perpendicular to the central axis. When it is smaller than 102%, the workpiece and the inside container 5 is unitarily joined to cause a damage in the side surface of the product. When it is larger than 118%, the sealability between the workpiece and the inside container is deteriorated, which may cause variance of the plugging depth. The diameter of the inner periphery of the inside container 5 means the inner diameter (diameter on the inner periphery side) when the cylindrical portion (portion excluding the bottom portion) of the inside container 5 is cut along a plane perpendicular to the central axis. In addition, the cylindrical portion of the inside container 5 may have a cylindrical shape (cylindrical shape where the side face crosses the bottom face at right angles) or a frustum shape of a circular cone (the angle formed by the side face and the bottom face is not a right angle, and the area of the open end portion is different from the area of the bottom face). When the shape of the inside container 5 is a frustum of a circular cone, it is preferable that the diameter of the inner periphery at the open end portion is small. The diameter of the inner periphery at the open end portion is desirably larger than the diameter of the inner periphery at the bottom face. In addition, in the case that the shape of the inside container 5 is a frustum of a circular cone, the smaller diameter between the diameters on both the end portions in the central axial direction is determined as the diameter of the inner periphery of the inside container 5.

In the method for manufacturing a plugged honeycomb structure of the present embodiment, the depth of the inside container is preferably 40 to 150% of that of the outside container. Further, the diameter of the outer periphery of the inside container is preferably 90 to 98% of the diameter of the inner periphery of the outside container. When the depth of the inside container is below 40% of the depth of the outside container, the honeycomb formed body may get the end of the inside container therein upon injection to make plugging impossible. When the depth of the inside container is above 150% of the depth of the outside container, the honeycomb formed body may get the folded portion (open end portion) of the inside container therein upon injection to make plugging impossible. In addition, when the diameter of the outer periphery of the inside container is below 90% of the diameter of the inner periphery of the outside container, the deviation of the central point of the inside container from the central point of the outside container becomes large, which may make plugging difficult since the central position of the workpiece does not match the central portion of the inside container upon inserting the honeycomb formed body under pressure. When the diameter of the outer periphery of the inside container is above 98% of the diameter of the inner periphery of the outside container, the inside container sticks firmly to the outside container, which may deteriorate plugging quality.

In the method for manufacturing a plugged honeycomb structure of the present embodiment, the bending strength of the outside container 4 according to the ASTM test is preferably 100 MPa or more, more preferably 105 to 150 MPa. When it is lower than 100 MPa, since it is soft, handling with the inside container put therein may be difficult. As the material for the outside container 4, metal is preferable, and, specifically, stainless steel or aluminum alloy is preferable.

In the method for manufacturing a plugged honeycomb structure of the present embodiment, the plugging slurry preferably contains the same raw material as the forming raw material of the honeycomb formed body. In addition, the viscosity of the plugging slurry is preferably 10 to 1000 dPa·s at normal temperature. When it is lower than 10 dPa·s, a depression (sink) may be formed in a plugging portion (pre-drying plugging portion), and the plugging portion (pre-drying plugging portion) may have a protrusion (dropping plug) from the end face of the honeycomb formed body. When it is higher than 1000 dPa·s, the plugging slurry may hardly be filled into cells of the honeycomb formed body. The viscosity of the plugging slurry is measured with a B type viscometer.

The pressure upon inserting the honeycomb formed body into the inside container is preferably about 0.05 to 5.0 MPa When it is lower than 0.05 MPa, the plugging slurry may hardly be filled into cells of the honeycomb formed body. When it is higher than 5.0 MPa, the honeycomb formed body may be chipped.

It is preferable that, after filling the plugging slurry in one end portion of each of cells of the honeycomb formed body (one end face of the honeycomb formed body) by performing the aforementioned plugging slurry injection operation, the plugging slurry is filled into the other end portion of each of cells of a honeycomb formed body (the other end face of the honeycomb formed body).

Upon filling the plugging slurry on the other end face of the honeycomb formed body, it is preferable that, after a sheet is bonded to the other end face of the honeycomb formed body in the first place, holes are made at positions corresponding to the cells where the plugging slurry was not filled in the one end face. The kind of the sheet and the method of making holes are preferably the same as in the case where the plugging slurry is filled in the one end face of the honeycomb formed body. Then, the plugging slurry injection operation is performed to fill the plugging slurry into the other end face of the honeycomb formed body. The plugging slurry injection operation is preferably the same as in the aforementioned case where the plugging slurry is filled into the one end face of the honeycomb formed body.

Figure 8:
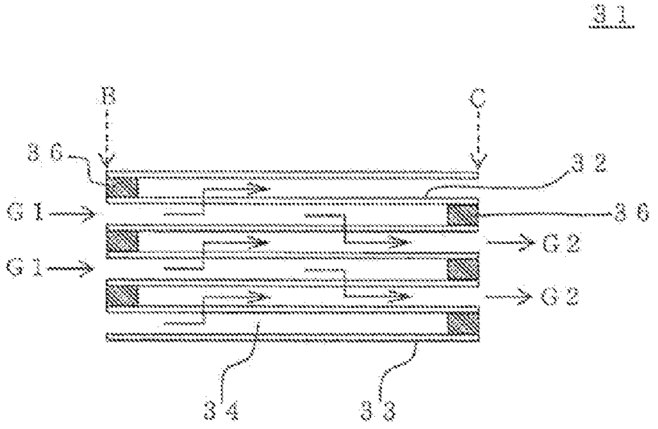
FIG. 8 is a schematic view showing a cross section parallel to the central axis, showing a plugged honeycomb structure.

(3) Manufacture of Plugging Honeycomb Structure:

It is preferable that the honeycomb formed body where plugging slurry is filled is fired to obtain a plugged honeycomb structure (see, e.g., FIG. 8) where plugging portions are formed in predetermined positions of both the end faces (so that each of the end faces shows, for example, a checkerwise pattern). It is preferable to perform degreasing (calcining) in order to remove the binder and the like before firing. The calcination is performed at a highest temperature of 400 to 500° C. for 0.5 to 40 hours in an ambient atmosphere. The methods of calcination and firing are not particularly limited, and the firing can be performed by the use of an electric furnace, a gas furnace, or the like. As the firing conditions, the firing is preferably performed at a highest temperature of 1300 to 1500° C. for 1 to 50 hours in an ambient atmosphere, or, as necessary, an inert atmosphere such as nitrogen or argon. In particular, in the case of obtaining a cordierite honeycomb structure, the firing at a highest temperature of about 1350 to 1440° C. in an ambient atmosphere is preferable.

In the plugged honeycomb structure of the present embodiment, the plugging slurry is filled into the dried honeycomb formed body, and then the honeycomb formed body and the pre-drying plugging portions are fired. However, the plugging slurry may be filled after firing the honeycomb formed body. In this case, it is preferable that, after the dried honeycomb formed body is fired under the conditions described in the aforementioned "(3) Manufacture of plugging honeycomb structure", the plugging slurry is filled into the fired honeycomb formed body under the conditions described in the aforementioned "(2) Formation of plugging portion". In addition, it is preferable that, after the plugging slurry is filled into the fired honeycomb formed body, the plugging portions are solidified, and firing and the like are performed under the conditions described in the aforementioned "(3) Manufacture of plugging honeycomb structure" as necessary in order to make the plugging portions stick firmly to partition walls.

The partition walls of the plugged honeycomb structure obtained above are preferably porous. The lower limit of the open porosity of the partition walls of the plugged honeycomb structure is preferably 30%, more preferably 35%. The upper limit of the open porosity of the partition walls of the plugged honeycomb structure is preferably 80%, more preferably 65%. By setting the upper limit and the lower limit of the open porosity to such values, pressure loss can be decreased with maintaining the strength. When the open porosity is below 30%, the pressure loss may increase. When the open porosity is above 80%, the thermal conductivity may fall as the strength decreases. The open porosity is measured by the Archimedes method.

The lower limit of the average pore size of the partition walls of the plugging honeycomb structure is preferably 5 μm, more preferably 7 μm. In addition, the upper limit of the average pore size is preferably 50 μm, more preferably 35 μm. By setting the upper limit and the lower limit of the average pore size to such values, when the plugged honeycomb structure to be manufactured is used as a filter, particulate matter (PM) can effectively be trapped. When the average pore size is below 5 μm, clogging is easily caused by the particulate matter (PM). When the average pore size is above 50 μm, the particulate matter (PM) may pass through without being trapped by the filter. The average pore size is measured with a mercury porosimeter. For example, Porosimeter Model 9810 (trade name) produced by Shimadzu Corporation can be used for the measurement.

When the material for the partition walls of the plugged honeycomb structure is silicon carbide, the average particle diameter of the silicon carbide particles is preferably 5 to 100 μm. Such an average particle diameter has the advantage that the filter can easily be controlled to have a suitable porosity and pore size. When the average particle size is smaller than 5 μm, the pore size becomes too small. When the average particle size is larger than 100 μm, porosity may become small. When the pore size is too small, clogging is easily caused by particulate matter (PM). When the porosity is too small, the pressure loss may increase. The average particle diameter is measured according to JIS R 1629.

There is no particular limitation on the cell shape (cell shape in a cross section perpendicular to the central axis (cell extending direction) of the plugged honeycomb structure) of the plugged honeycomb structure, and examples of the shape include a triangle, a quadrangle, a hexagon, an octagon, a circle, and a combination of these shapes. A suitable example is a combination of an octagon and a quadrangle. The thickness of the partition walls of the plugged honeycomb structure is preferably 50 to 2000 μm. When the thickness of the partition walls is smaller than 50 μm, strength of the plugged honeycomb structure may decrease. When it is larger than 2000 μm, pressure loss may increase. Though there is no particular limitation on the cell density of the plugged honeycomb structure, it is preferably 0.9 to 311 cells/cm$^2$, more preferably 7.8 to 62 cells/cm$^2$.

EXAMPLE

Hereinbelow, the present invention will be described more specifically by Examples. However, the present invention is by no means limited to these Examples.

Example 1

(Manufacture of Honeycomb Formed Body)

After the mixed raw material composed of a cordierite-forming raw material, an organic binder, a pore former, and water was formed into a honeycomb shape, it was dried to manufacture a cylindrical (circular columnar) honeycomb formed body having a length of 305 mm and a bottom face having a diameter of 314 mm. A cross-sectional shape of the cells perpendicular to the extending direction of the honeycomb formed body was square, the thickness of the partition walls was about 310 μm, and the cell density was 300 cells/sq.in.

(Preparation of Plugging Slurry) To 100 parts by mass of a cordierite powder were added 1.5 parts by mass of methyl cellulose, 8 parts by mass of glycerin, and 40 parts by mass of water, and they were kneaded to prepare plugging slurry. Incidentally, the viscosity of the plugging slurry prepared above was 200 dPa·s.

In the honeycomb formed body obtained above, plugging portions were formed in an end portion of each cell to plug adjacent cells in the mutually opposite end portions in such a manner that each of both the end faces shows a checkerwise pattern by the plugging slurry injection operation. As the inside container used for the plugging slurry injection operation, a bottomed cylindrical container having a height of 50 mm and a bottom face having a circular shape having a diameter (corresponding to the inner diameter of the cylinder) of 320 mm. The thickness of the inside container was 0.5 mm, and the depth of the inside container was 49.5 mm. The material for the inside container was ether based polyurethane rubber having a Young's modulus of 40 MPa and a tensile stress of 1.5 MPa. As the outside container, there was used a bottomed cylindrical container having a height of 45 mm and a bottom face having a circular shape having a diameter (corresponding to the inner diameter of the cylinder) of 328 mm. The thickness of the outside container was 3 mm, and the depth of the outside container was 42 mm. The material for the outside container was stainless steel (SUS304). The bending strength of the outside container according to the ASTM test was 120 MPa. The Young's modulus was measured according to JIS K6253 by the use of Digitest II (trade name) (detector: Shore A) produced by M & K Co., Ltd. The tensile stress was measured according to a test method with a dumbbell-shaped test piece. In addition, the tensile stress was measured by the use of Tensile Tester with Extensometer, Minitech (single column desktop type), produced by M & K Co., Ltd. The tensile stress was measured according to JIS K 6251"Vulcanized rubber and thermoplastic rubber—Determination of tensile properties". In addition, the shape of the test piece was JIS K 6251, No. 3, and the tension rate of the test piece was 200 mm/min. The ratio (depth ratio (%)) of the depth of the outside container to the depth of the inside container (100× depth of the inside container/depth of the outside container) was 111%. In addition, the ratio (outer periphery diameter ratio (%)) of the diameter of the outer periphery of the inside container to the diameter of the inner periphery of the outside container (100× diameter of the outer periphery of the inside container/diameter of the inner periphery of the outside container) was 98%. In addition, the ratio (inner periphery diameter ratio (%)) of the diameter of the inner periphery of the inside container to the diameter (honeycomb formed body diameter) of a cross section perpendicular to the central axis of a honeycomb formed body (100× diameter of the inner periphery of the inside container/diameter of the honeycomb formed body) was 102%.

Upon the plugging slurry injection operation, an adhesive film was bonded to an end face on one side of the honeycomb formed body, and holes were made in the adhesive film at positions corresponding to cells where plugging portions were to be formed. The material for the adhesive film was PP (polypropylene). Upon performing the plugging slurry injection operation, the inside container is disposed in the outside container, plugging slurry is put in the inside container, the honeycomb formed body is inserted into the inside container to inject the plugging slurry into cells by pressing the one end portion against the bottom face of the inside container, and then the honeycomb formed body was pulled out form the inside container. Then, the honeycomb formed body was dried at 100° C. for 120 seconds. The depth of the plugging slurry stored in the inside container was 10 mm. Then, the plugging slurry was filled into the other end face of the honeycomb formed body in the same manner and then dried. Thus, there was obtained a honeycomb formed body where pre-drying plugging portions were disposed in both the end faces in such a manner that each of the end faces showed a checkerwise pattern.

Then, the honeycomb formed body was fired at 1400° C. for 20 hours in an ambient atmosphere to obtain a plugged honeycomb structure. The plugged honeycomb structure had a circular columnar shape having "a length of 305 mm and a circular bottom face having a diameter of 303 mm". In addition, the plugged honeycomb structure had porous partition walls. The plugged honeycomb structure had an average pore size of 13 μm and a porosity of 0.41%. The average pore size was measured with a mercury porosimeter, and the porosity was measured by the Archimedes method.

The plugged honeycomb structure obtained above was measured for variance of the depth of the plugging portions (plugging depth) and extent of depressions in the plugging portions (plugging quality) in the end faces of the plugged honeycomb structure according to the following method. The results are shown in Table 1-1.

(Plugging Depth)

Plugging depth was measured by a caliper (Super Caliper produced by Mitutoyo Corporation) after plugging portions were cut vertically to calculate variance from the measured depth values. When the variance of the plugging depth was 0, "A" was given. When it was within 0.5, "B" was given. When it was within 1, "C" was given. When it was above 1, "D" was given. "A" and "B" were determined as "passed", and "C" and "D" were determined as "failed".

(Plugging Quality)

The depression of the plugging portion was evaluated by tertiary height measurement with Microscope VHX-1000 produced by Keyence Corporation. With the end face of the honeycomb structure as normal, when the percentage of the plugging portion having a depression having a depth of 500 μm or more was 0% of the entire plugging portion, "A" was given. When it was 5% or less, "B" was given. When it was 10% or less, "C" was given. When it was above 10%, "D" was given. "A" and "B" were determined as "passed", and "C" and "D" were determined as "failed".

TABLE 1-1

| | Inside container | | | | | | | | | | |
|---|---|---|---|---|---|---|---|---|---|---|---|
| | Presence or absence | Material | Young's modulus (MPa) | Tensile stress (MPa) | Depth ratio (%) | Outer periphery diameter ratio (%) | Thickness (mm) | Inner periphery diameter ratio (%) | Outside container Bending strength (MPa) | Plugging depth | Plugging quality |
| Example 1 | Present | Polyurethane | 40 | 1.5 | 111 | 98 | 0.5 | 102 | 100 | A | A |
| Example 2 | Present | rubber | 5 | 1.5 | 111 | 98 | 0.5 | 102 | 100 | B | B |
| Example 3 | Present | | 10 | 1.5 | 111 | 98 | 0.5 | 102 | 100 | A | A |
| Example 4 | Present | | 500 | 1.5 | 111 | 98 | 0.5 | 102 | 100 | A | A |
| Example 5 | Present | | 550 | 1.5 | 111 | 98 | 0.5 | 102 | 100 | B | B |
| Example 6 | Present | | 40 | 0.5 | 111 | 98 | 0.5 | 102 | 100 | B | B |
| Example 7 | Present | | 40 | 1 | 111 | 98 | 0.5 | 102 | 100 | A | A |
| Example 8 | Present | | 40 | 7.5 | 111 | 98 | 0.5 | 102 | 100 | A | A |
| Example 9 | Present | | 40 | 11 | 111 | 98 | 0.5 | 102 | 100 | B | B |
| Example 10 | Present | | 40 | 1.5 | 35 | 98 | 0.5 | 102 | 100 | C | B |
| Example 11 | Present | | 40 | 1.5 | 40 | 98 | 0.5 | 102 | 100 | A | A |
| Example 12 | Present | | 40 | 1.5 | 150 | 98 | 0.5 | 102 | 100 | A | B |
| Example 13 | Present | | 40 | 1.5 | 155 | 98 | 0.5 | 102 | 100 | C | B |
| Example 14 | Present | | 40 | 1.5 | 111 | 89 | 0.5 | 102 | 100 | B | C |
| Example 15 | Present | | 40 | 1.5 | 111 | 90 | 0.5 | 102 | 100 | A | B |
| Example 16 | Present | | 40 | 1.5 | 111 | 99 | 0.5 | 102 | 100 | B | C |

TABLE 1-2

| | Inside container | | | | | | | | | | |
|---|---|---|---|---|---|---|---|---|---|---|---|
| | Presence or absence | Material | Young's modulus (MPa) | Tensile stress (MPa) | Depth ratio (%) | Outer periphery diameter ratio (%) | Thickness (mm) | Inner periphery diameter ratio (%) | Outside container Bending strength (MPa) | Plugging depth | Plugging quality |
| Example 17 | Present | Polyurethane | 40 | 1.5 | 111 | 98 | 0.4 | 102 | 100 | B | C |
| Example 18 | Present | rubber | 40 | 1.5 | 111 | 98 | 2.5 | 102 | 100 | B | A |
| Example 19 | Present | | 40 | 1.5 | 111 | 98 | 2.6 | 102 | 100 | B | C |

TABLE 1-2-continued

| | Inside container | | | | | | | | Outside container | | |
|---|---|---|---|---|---|---|---|---|---|---|---|
| | Presence or absence | Material | Young's modulus (MPa) | Tensile stress (MPa) | Depth ratio (%) | Outer periphery diameter ratio (%) | Thickness (mm) | Inner periphery diameter ratio (%) | Bending strength (MPa) | Plugging depth | Plugging quality |
| Example 20 | Present | | 40 | 1.5 | 111 | 98 | 0.5 | 101 | 100 | C | B |
| Example 21 | Present | | 40 | 1.5 | 111 | 98 | 0.5 | 118 | 100 | A | A |
| Example 22 | Present | | 40 | 1.5 | 111 | 98 | 0.5 | 119 | 100 | C | B |
| Example 23 | Present | | 40 | 1.5 | 111 | 98 | 0.5 | 102 | 95 | B | B |
| Example 24 | Present | | 40 | 1.5 | 111 | 98 | 0.5 | 102 | 105 | A | A |
| Example 25 | Present | | 40 | 1.5 | 111 | 98 | 0.5 | 102 | 90 | B | C |
| Example 26 | Present | Silicone rubber | 40 | 1.5 | 111 | 98 | 0.5 | 102 | 100 | A | A |
| Example 27 | Present | Fluoro-rubber | 40 | 1.5 | 111 | 98 | 0.5 | 102 | 100 | A | A |
| Example 28 | Present | NR | 5 | 0.5 | 111 | 98 | 0.5 | 102 | 100 | B | B |
| Comp. Ex. 1 | Absent | — | — | — | — | — | — | — | 100 | D | D |
| Comp. Ex. 2 | Present | Polyurethane | 4 | 1.5 | 111 | 98 | 0.5 | 102 | 100 | D | C |
| Comp. Ex. 3 | Present | rubber | 600 | 1.5 | 111 | 98 | 0.5 | 102 | 100 | D | D |
| Comp. Ex. 4 | Present | | 40 | 0.4 | 111 | 98 | 0.5 | 102 | 100 | C | D |
| Comp. Ex. 5 | Present | | 40 | 12 | 111 | 98 | 0.5 | 102 | 100 | D | C |

Example 2 to 28

The plugged honeycomb structures were manufactured in the same manner as in Example 1 except that the material, Young's modulus, and tensile stress of the inside container were changed and that the "depth ratio", "outer periphery diameter ratio", "thickness", and "inner periphery diameter ratio" were changed by changing the shape of the inside container. The plugged honeycomb structures were measured for the variance of the depth of plugging portions (plugging depth) and the extent of the depression of the plugging portions in the end faces of the plugged honeycomb structure by the aforementioned method (plugging quality) in the same manner as in Example 1. The results are shown in Table 1-1, Table 1-2.

Comparative Example 1

The plugged honeycomb structure was manufactured in the same manner as in Example 1 except that the inside container was not used. The plugged honeycomb structure was measured for the variance of the depth of plugging portions (plugging depth) and the extent of the depression of the plugging portions (plugging quality) in the end faces of the plugged honeycomb structure by the aforementioned method in the same manner as in Example 1. The results are shown in Table 1-2.

Comparative Examples 2 to 5

The plugged honeycomb structures were manufactured in the same manner as in Example 1 except that the material, Young's modulus, and tensile stress of the inside container were changed and that the "depth ratio", "outer periphery diameter ratio", "thickness", and "inner periphery diameter ratio" were changed by changing the shape of the inside container. The plugged honeycomb structures were measured for the variance of the depth of plugging portions (plugging depth) and the extent of the depression of the plugging portions (plugging quality) in the end faces of the plugged honeycomb structure by the aforementioned method in the same manner as in Example 1. The results are shown in Table 1-2.

From Table 1-1 and Table 1-2, it can be understood that the use of the inside container improved the plugging depth and the plugging quality to a large extent (Examples 1 to 28 and Comparative Example 1). In addition, it can be understood that the plugging depth and plugging quality were good when the Young's modulus of the inside container was 5 to 550 MPa (Examples 2, 5 and Comparative Examples 2, 3). Further, it can be understood that the plugging depth and plugging quality were particularly good when the Young's modulus of the inside container was 10 to 500 MPa.

Further, it can be understood that the plugging depth and plugging quality were good when the tensile stress was 0.5 to 11 MPa (Examples 6, 9 and Comparative Examples 4, 5). Further, it can be understood that the plugging depth and plugging quality were particularly good when the tensile stress was 1 to 7.5 MPa.

Industrial Applicability

A method for manufacturing a honeycomb structure of the present invention can be used for manufacturing a plugged honeycomb structure suitably used as a carrier for a catalyst device or as a filter for an environmental measure, collection of a specific substance, or the like, in various fields such as an automobile, chemistry, electric power, and iron and steel.

DESCRIPTION OF REFERENCE NUMERALS

1: cell, 2: partition wall, 3: plugging container, 4: outside container, 5: inside container, 5*a*: bottom face of the inside container, 6: plugging slurry, 10: honeycomb formed body, 10*a*: one end face, 10*b*: the other end face, 11: one end portion, 21: pre-drying plugging portion, 31: plugged honeycomb structure, 32: partition wall, 33: honeycomb structure, 34: cell, 36: plugging portion, B: inlet face, C: outlet face, G1: target gas to be treated, G2: treated gas

The invention claimed is:

1. A method for manufacturing a plugged honeycomb structure comprising:

a step of forming a columnar honeycomb formed body having partition walls separating and forming a plurality of cells extending from one end face to the other end face and functioning as fluid passages, and a plugging step of forming plugging portions in an end portion of each of the cells of the honeycomb formed body;

wherein the plugging step has a plugging slurry injection operation where plugging slurry is injected into the cells by inserting the honeycomb formed body into a bottomed cylindrical inside container containing the plugging slurry and having a Young's modulus of 5 to 550 MPa and a tensile stress of 0.5 to 11 MPa and being disposed in a bottomed cylindrical outside container and by pressing one end portion against the bottom face of the inside container, and then the honeycomb formed body is pulled out from the inside container, and wherein when the honeycomb formed body is pulled from the inside container, a shape of the bottomed cylindrical inside container is changed in a way that a central portion of the bottom face of the inside container is raised and an outer rim portion of an end face of the honeycomb formed body is separated from the bottom face of the inside container.

2. A method for manufacturing a plugged honeycomb structure according to claim 1, wherein the depth of the inside container is 40 to 150% of the depth of the outside container and wherein the diameter of the outer periphery of the inside container is 90 to 98% of the diameter of the inner periphery of the outside container.

3. A method for manufacturing a plugged honeycomb structure according to claim 1, wherein the material for the inside container is at least one kind selected from the group consisting of polyurethane rubber, silicone rubber, neoprene rubber, fluoro-rubber, and natural rubber.

4. A method for manufacturing a plugged honeycomb structure according to claim 2, wherein the material for the inside container is at least one kind selected from the group consisting of polyurethane rubber, silicone rubber, neoprene rubber, fluoro-rubber, and natural rubber.

5. A method for manufacturing a plugged honeycomb structure according to claim 1, wherein the thickness of the inside container is 0.5 to 2.5 mm.

6. A method for manufacturing a plugged honeycomb structure according to claim 2, wherein the thickness of the inside container is 0.5 to 2.5 mm.

7. A method for manufacturing a plugged honeycomb structure according to claim 3, wherein the thickness of the inside container is 0.5 to 2.5 mm.

8. A method for manufacturing a plugged honeycomb structure according to claim 1, wherein the diameter of inner periphery of the inside container is 102 to 118% of the diameter of a cross section perpendicular to a central axis of the honeycomb formed body.

9. A method for manufacturing a plugged honeycomb structure according to claim 2, wherein the diameter of inner periphery of the inside container is 102 to 118% of the diameter of a cross section perpendicular to a central axis of the honeycomb formed body.

10. A method for manufacturing a plugged honeycomb structure according to claim 3, wherein the diameter of inner periphery of the inside container is 102 to 118% of the diameter of a cross section perpendicular to a central axis of the honeycomb formed body.

11. A method for manufacturing a plugged honeycomb structure according to claim 1, wherein the material for a honeycomb structure to be manufactured is ceramic.

12. A method for manufacturing a plugged honeycomb structure according to claim 2, wherein the material for a honeycomb structure to be manufactured is ceramic.

13. A method for manufacturing a plugged honeycomb structure according to claim 1, wherein the bending strength of the outside container according to an ASTM test is 100 MPa or more.

14. A method for manufacturing a plugged honeycomb structure according to claim 2, wherein the bending strength of the outside container according to an ASTM test is 100 MPa or more.

15. A method for manufacturing a plugged honeycomb structure according to claim 1, wherein the material for the outside container is metal.

16. A method for manufacturing a plugged honeycomb structure according to claim 2, wherein the material for the outside container is metal.

17. A method for manufacturing a plugged honeycomb structure according to claim 1, wherein a pressure upon inserting the honeycomb formed body into the inside container is 0.05 to 5.0 MPa.

* * * * *